US008638999B2

(12) United States Patent
Xu et al.

(10) Patent No.: US 8,638,999 B2
(45) Date of Patent: Jan. 28, 2014

(54) METHODS FOR GENERATING A RECONSTRUCTED TREE STRUCTURE FROM MEDICAL IMAGE DATA

(75) Inventors: Ziyue Xu, Iowa City, IA (US); Fei Zhao, Schenectady, NY (US); Roshni Rustom Bhagalia, Niskayuna, NY (US); Bipul Das, Bangalore (IN)

(73) Assignee: General Electric Company, Niskayuna, NY (US)

( * ) Notice: Subject to any disclaimer, the term of this patent is extended or adjusted under 35 U.S.C. 154(b) by 99 days.

(21) Appl. No.: 13/448,015

(22) Filed: Apr. 16, 2012

(65) Prior Publication Data

US 2013/0272596 A1  Oct. 17, 2013

(51) Int. Cl.
*G06K 9/00* (2006.01)
(52) U.S. Cl.
USPC ............................ 382/128; 382/173; 382/181
(58) Field of Classification Search
USPC .......................................... 382/128, 173, 181
See application file for complete search history.

(56) References Cited

U.S. PATENT DOCUMENTS

| 6,690,816 | B2* | 2/2004 | Aylward et al. | 382/128 |
|---|---|---|---|---|
| 7,203,354 | B2 | 4/2007 | Wilson et al. | |
| 7,711,165 | B2* | 5/2010 | Lesage et al. | 382/128 |
| 7,940,971 | B2* | 5/2011 | Zhang et al. | 382/128 |
| 7,970,189 | B2 | 6/2011 | Buelow et al. | |
| 8,090,164 | B2* | 1/2012 | Bullitt et al. | 382/128 |
| 8,422,754 | B2* | 4/2013 | Gupta et al. | 382/128 |
| 8,488,852 | B2* | 7/2013 | Gupta et al. | 382/128 |
| 2012/0237094 | A1* | 9/2012 | Kurihara et al. | 382/128 |

OTHER PUBLICATIONS

Yim et al., "Gray-Scale Skeletonization of Small Vessels in Magnetic Resonance Angiography", IEEE Transactions on Medical Imaging, vol. 19, Issue 6, Jun. 2000.
Chen et al., "Automatic 3D Vascular Tree Construction in CT Angiography", Computerized Medical Imaging and Graphics, vol. 27, Issue 6, pp. 469-479, Nov. 2003.
Langs et al., "Building and Registering Parameterized 3D Models of Vessel Trees for Visualization during Intervention", 2004.
Manniesing et al., "Vessel Axis Tracking Using Topology Constrained Surface Evolution", IEEE Transactions on Medical Imaging, vol. 26, Issue 3, Mar. 2007,pp. 309-316.
Xu et al., "Quantification of Stenosis in Coronary Artery via CTA Using Fuzzy Distance Transform", Proceedings of SPIE, vol. 7262, pp. 72620K-72620K-12, 2009.
Friman et al., "Multiple Hypothesis Template Tracking of Smail 3D Vessel Structures", Medical Image Analysis, vol. 14, pp. 160-171, 2010.
Xu et al., "Quantification of Coronary Arterial Stenoses in CTA Using Fuzzy Distance Transform", Computerized Medical Imaging and Graphics, vol. 36, Issue 1, pp. 11-24, Jan. 2012.

* cited by examiner

*Primary Examiner* — Tom Y Lu
(74) *Attorney, Agent, or Firm* — Jenifer E. Haeckl

(57) ABSTRACT

A computer-implemented method of post-processing medical image data is provided. The method includes receiving tracked image data representative of multiple blood vessels, generating a binary tree structure for the multiple blood vessels based on a parent-child relationship between branches of the multiple blood vessels, generating a likelihood model for determining a validity of the branches of the multiple blood vessels, and generating a likelihood score for each branch based on the respective branch's compatibility with the likelihood model. The method also includes generating a reconstructed tree for the multiple blood vessels. Compatible branches are included in the reconstructed tree, while invalid branches are not included in the reconstructed tree.

25 Claims, 6 Drawing Sheets

3/6

METHODS FOR GENERATING A RECONSTRUCTED TREE STRUCTURE FROM MEDICAL IMAGE DATA

BACKGROUND

Medical imaging systems have become a valuable tool in the diagnosis and treatment of many illnesses and diseases. However, one factor that can impair the usefulness of these imaging technologies is the relative difficulty in discerning a particular structure of interest from its background, especially when the background has a similar texture or structure. Segmentation programs have been developed to facilitate the examination of specific anatomical features by eliminating non-desired anatomical features from the image. For example, segmentation programs have been developed that enable bone to be removed from an image so that soft tissues may be observed more easily. In some applications, problems in identifying an anatomical feature may still exist after segmentation. For example, a segmentation program may be used to segment the blood vessels (e.g., of the coronary artery tree) around the heart from other soft tissues and bone. However, the extracted blood vessels may include neighboring regions falsely labeled as part of the blood vessels resulting in leakage. As a result, it may be difficult to identify or track an individual blood vessel as it courses its way around the heart.

BRIEF DESCRIPTION

In a first embodiment, a computer-implemented method of post-processing medical image data is provided. The method includes receiving tracked image data representative of multiple blood vessels, generating a binary tree structure for the multiple blood vessels based on a parent-child relationship between branches of the multiple blood vessels, generating a likelihood model for determining a validity of the branches of the multiple blood vessels, and generating a likelihood score for each branch based on the respective branch's compatibility with the likelihood model. The method also includes generating a reconstructed tree for the multiple blood vessels. Compatible branches are included in the reconstructed tree, while invalid branches are not included in the reconstructed tree.

In a second embodiment, a non-transitory, computer-readable medium that includes one or more routines which executed by at least one processor causes acts to be performed is provided. The acts include receiving tracked image data representative of multiple blood vessels, generating a binary tree structure for the multiple blood vessels based on a parent-child relationship between branches of the multiple blood vessels, generating a likelihood model for determining a validity of the branches of the multiple blood vessels, and generating a likelihood score for each branch based on the respective branch's compatibility with the likelihood model. The acts also include generating a reconstructed tree for the multiple blood vessels. Compatible branches are included in the reconstructed tree, while invalid branches are not included in the reconstructed tree.

In a third embodiment, a computer-implemented method for generating a reconstructed tree of multiple blood vessels is provided. The method includes using a learning-based probabilistic pruning algorithm to generate the reconstructed tree by executing the following steps. The steps include generating, from received tracked image data, a binary tree structure for the multiple blood vessels based on a parent-child relationship between branches of the plurality of blood vessels, wherein the received tracked image data is representative of multiple tracked blood vessels. The steps also include generating a likelihood model for determining a validity of the branches of the multiple blood vessels, wherein the likelihood model is trained using training data, and the training data is independent of the received tracked image data. The steps further include generating a likelihood score for each branch based on the respective branch's compatibility with the likelihood model. The steps yet further include generating a reconstructed tree for the plurality of blood vessels using dynamic programming, wherein compatible branches are included in the reconstructed tree and invalid branches are not included in the reconstructed tree.

BRIEF DESCRIPTION OF THE DRAWINGS

These and other features and aspects of the present embodiments will become better understood when the following detailed description is read with reference to the accompanying drawings in which like characters represent like parts throughout the drawings, wherein.

DETAILED DESCRIPTION

Figure 1:
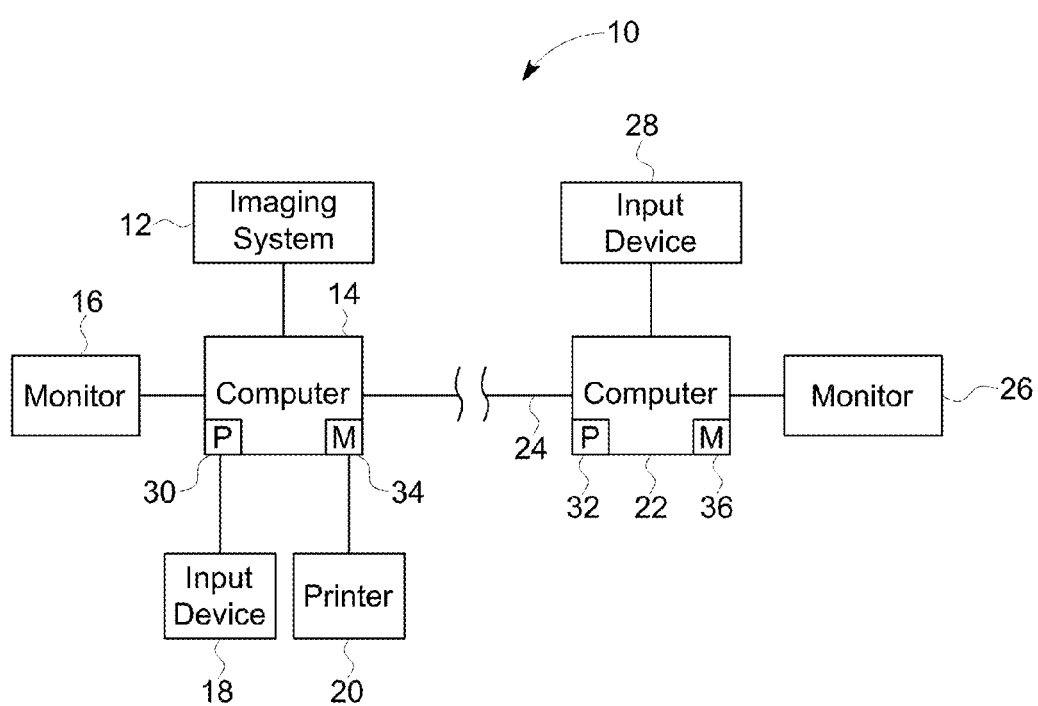
FIG. 1 is a diagrammatic view of a medical image processing system in accordance with embodiments of the present disclosure.

In the subsequent paragraphs, various aspects of generating a tree-like structure from tracked medical image data representative of blood vessels associated with a coronary artery, lung, brain, and any other anatomical region or organ of the body are described. The various aspects of the present techniques will be explained, by way of example only, with the aid of figures hereinafter. Referring generally to FIG. 1, a diagrammatical view of a medical image processing system 10 having an imaging system 12 that is operable to acquire and to produce medical image data of the internal anatomy of a patient is provided. The imaging system 12 may include one or more different imaging modalities, such as X-ray imaging systems, computed tomography (CT) imaging systems, magnetic resonance (MR) imaging systems, positron emission tomography (PET) imaging systems, ultrasound imaging systems, and so forth. In this embodiment, the medical image data obtained by the imaging system 12 is in a digital form. Also, the medical image data may be two-dimensional (2-D) or three-dimensional (3-D).

The imaging system is connected to a local computer 14 that enables a user to operate the imaging system 12 and other components of the medical image processing system 10. The local computer 14 is operable to receive the medical image data produced by the imaging system 12 and to process the medical image data to produce a medical image of the patient. A monitor 16 and input device 18 (e.g., a keyboard, mouse, and so forth) are provided to enable a user to interact with the local computer 14. A user may use these devices to instruct the local computer 14 to direct the imaging system 12 to image desired portions of a patient. In addition, a printer 20 is provided to enable hard copies of medical images to be printed.

A radiologist may receive and manipulate medical images using a remote computer 22 that is connected to the local computer 14 via a communications network 24, such as the Internet or as part of a picture archiving and communications system (PACS). Medical image data from the imaging system 12 may be retrieved by the remote computer 22 for diagnostic purposes or for further processing. As with the local computer 14, the remote computer 22 is provided with a monitor 26 and an input device 28 (e.g., keyboard, mouse, and so forth) to enable a user to interact with the remote computer 22.

In the illustrated embodiment, the local computer 14 and/or remote computer 22 is provided with programming that enables post-processing of tracked image data representative of a plurality of blood vessels to generate a tree-like structure. In particular, local computer 14 and/or remote computer 22 may each include a processor 30, 32 to implement a multi-step approach to generate the tree-like structure of blood vessels by removing leakage (i.e., neighboring regions near the blood vessels that are falsely labeled as part of the blood vessels of interest). Specifically, the processor 30, 32 is configured to execute one or more algorithms (which may be stored as executable code in a memory and/or storage device 34, 36) to implement each step of the multi-step approach. In particular, such executable code may cause, when executed, the processor 30, 32 to perform these steps. In certain embodiments, the medical image processing system 10 may include a special purpose processor and/or computer configured to implement the steps described below.

The processor 30, 32 utilizes a learning-based probabilistic pruning algorithm to generate the tree-like structure (e.g., reconstructed tree). In particular, the processor 30, 32 is configured to receive tracked image data representative of a plurality of blood vessels. The received tracked image data includes data extracted from image data via segmentation algorithms and/or tracking algorithms (e.g., a probabilistic tracking algorithm). The tracked image data may include 2-D or 3-D image data. As described in greater detail below, the processor 30, 32 is also configured to generate a binary tree structure (e.g., binary tree decomposition) for the plurality of blood vessels based on a parent-child relationship between branches of the plurality of blood vessels. It should noted the term "branch" may be used interchangeably with the terms "node" or "segment" below. The processor 30, 32 may generate a likelihood model for determining a validity of the branches of the plurality of blood vessels. In certain embodiments, the likelihood model may be generated by training the model with training data using selected features (e.g., inter-branch and intra-branch features) of the plurality of blood vessels in the tracked image data as parameters in the training and generating of the likelihood model. The training procedure is performed offline. Also, the training data is independent of the tracked image data. In addition, the likelihood model may be trained using a multivariate model (e.g., Gaussian model, a Random Forest model, or a support vector machine (SVM) model). Further, the processor 30, 32 is configured to generate a reconstructed tree for the plurality of blood vessels, where compatible branches are included in the reconstructed tree and incompatible branches are not included (i.e., removed or pruned) in the reconstructed tree. For example, in certain embodiments, the processor 30, 32 may use dynamic programming (e.g., dynamic programming algorithm) to determine a global maximum achievable score for a sub tree rooted at each branch of the blood vessels and to remove all sub trees with a negative score.

Figure 2:
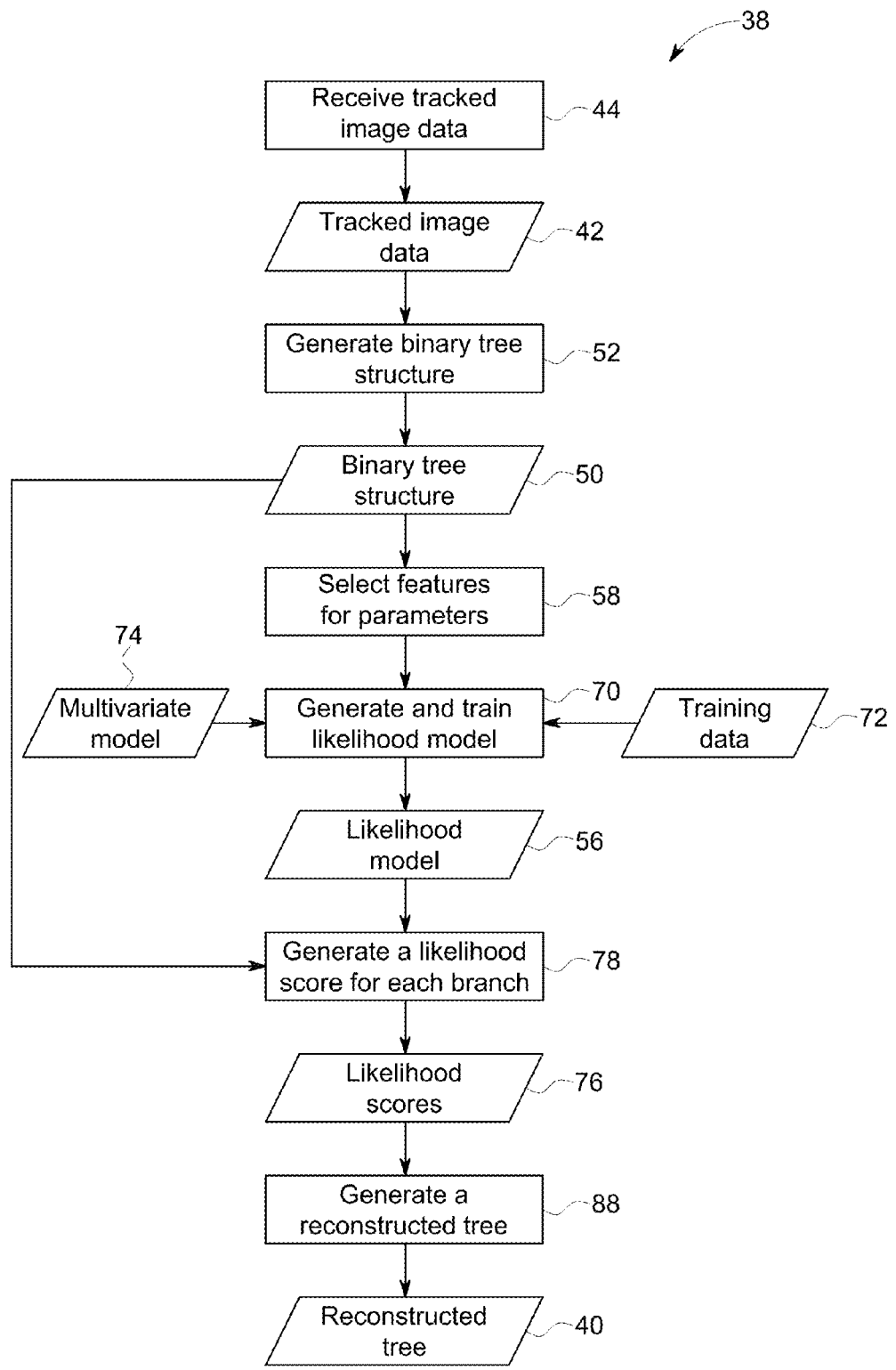
FIG. 2 is a flow chart illustrating a method for generating a reconstructed tree from tracked image data having leakage using the medical image processing system of FIG. 1 in accordance with embodiments of the present disclosure.
Figure 3:
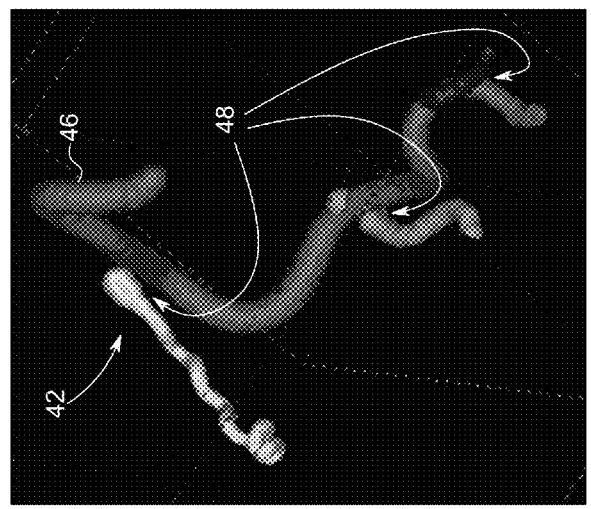
FIG. 3 is a representation of tracked image data.

FIG. 2 is a flow chart illustrating a method 38 for generating a reconstructed tree 40 from tracked image data 42 having leakage using the medical image processing system 10 of FIG. 1. Some or all of the following steps may be performed automatically. The method 38 includes receiving tracked image data 42 representative of a plurality of blood vessels (block 44). In particular, the tracked image data 42 includes data previously extracted from image data via segmentation algorithms and/or tracking algorithms (e.g., probabilistic tracking algorithm). The tracked image data 42 may include leakage (i.e., neighboring regions of the extracted blood vessels of interest that are falsely labeled as part of the blood vessels). The tracked image data 42 may include 2-D or 3-D image data. FIG. 3 illustrates an example of tracked image data 42. In particular, FIG. 3 illustrates a 3-D rendering of a tracked vessel branch 46 with multiple bifurcations 48 as determined by a probabilistic tracking algorithm.

Figure 4:
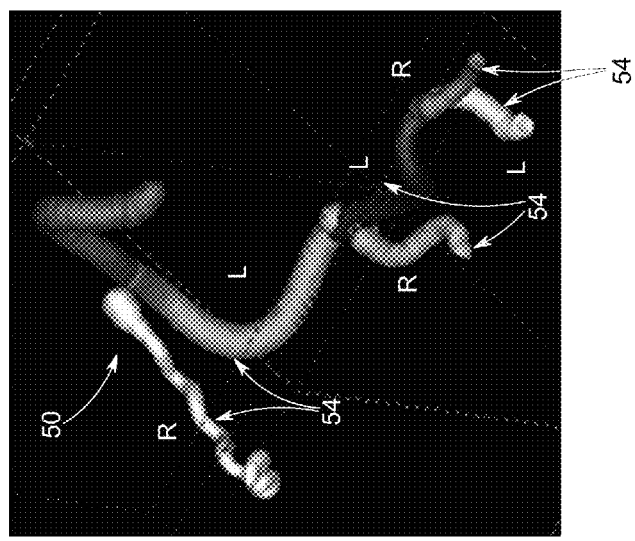
FIG. 4 is a representation of a binary tree structure generated using the medical image processing system of FIG. 1 in accordance with embodiments of the present disclosure.

The method 38 includes generating a binary tree structure 50 (e.g., binary tree decomposition) for the plurality of blood vessels from the tracked image data 42 (block 52). In particular, a learning-based pruning algorithm is utilized to reorganize the tracked image data 42 into a proper tree structure 50 based on a parent-child relationship between branches of the plurality of blood vessels. Specifically, each tracked branch is broken into several segments (e.g., branches or nodes) so that each segment is considered a new branch. For example, each tracked branch may be segmented at bifurcation points to form child nodes. Thus, every segment is a node (e.g., parent node) in the tree, and each node of the tree can at most include two child nodes connected at an end of each respective node. Some of the nodes may be both a child node and a parent node. The child nodes may be labeled as a left child or a right child. The left child is usually defined as the more compatible of the child nodes with the parent node. Because the left child node and the parent node usually belong to the same branch before segmentation of the branches at bifurcation points. The right child node is usually the less compatible of the child nodes with the parent node because it bifurcates from the original branch. In certain embodiments, each node may be colored with a different color to distinguish it from other nodes. The binary tree structure enables multiple graph algorithms to process the data more easily. FIG. 4 illustrates an example of the binary tree structure 50 generated for the plurality of blood vessels from the tracked image data 42 of FIG. 3. As illustrated, the child nodes 54 are labeled as left child (L) and right child (R) nodes.

After generating the binary tree structure 50 (block 48), the method 38 includes selecting one or more features from the plurality of blood vessels in the binary tree structure 50 for use as parameters in generating a likelihood model 56 (e.g., branch validity likelihood model) as well as parameters in distinguishing between leakage and valid branches (block 58). Examples of these features are listed in Table 1. It is noted that the listed features are not inclusive and other features may be used as parameters in generating the likelihood model 56. A user may select the one or more features. Alternatively, the one or more features may be selected automatically. The features may include inter-branch features and intra-branch features. Some of the features may be designed for specific tasks, while other features may be designed for general tasks that are independent of particular applications (e.g., coronary artery, lung, brain, and so forth) and algorithms. The inter-branch features include both general and specific features, while the intra-branch features includes only specific features. In certain embodiments, the general features may be first selected as parameters. Then, based on the observation of data, additional features (e.g., special features) may be selected to enhance the performance of the learning-based pruning algorithm.

TABLE 1

| | | Features | Description |
|---|---|---|---|
| Inter-branch | General | radiusDiff | Radius difference from parent branch |
| | | radiusRatio | Radius ratio with parent branch |
| | | directionDiff | Directional difference from parent branch |
| | Specific | endDistToLeftChild | Minimum distance at the end of one branch to its left brother node |
| | | meanEndDistRatio | Ratio between the mean and end distance of a branch to its left brother node |
| Intra-branch | | meanLikelihood | Likelihood value given by probabilistic tracking algorithm |
| | | radiusEndFront | Radius difference between the end |
| | | slope | Slope of the linear regression line for the radius profile along the branch |

The general inter-branch features are used to test the compatibility of a single branch to its parent. Examples of general inter-branch features include a radius difference of the single branch to the parent branch (radiusDiff), a radius ratio of the single branch with the parent branch (radiusRatio), or a directional difference between the single branch and the parent branch (directionDiff). Certain specific inter-branch features are helpful in distinguishing between parallel (i.e., leakage branch that runs parallel to sibling node) and bifurcation-merge leakage (i.e., leakage branch that bifurcates from parent node and merges with sibling node). For example, specific inter-branch features that may help distinguish between parallel and bifurcation-merge leakage include a minimum distance at an end of a respective branch to its left brother node (endDistToLeftChild) and a ratio between a mean and an end distance of the respective branch to its left brother node (meanEndDistRatio).

Figure 5:
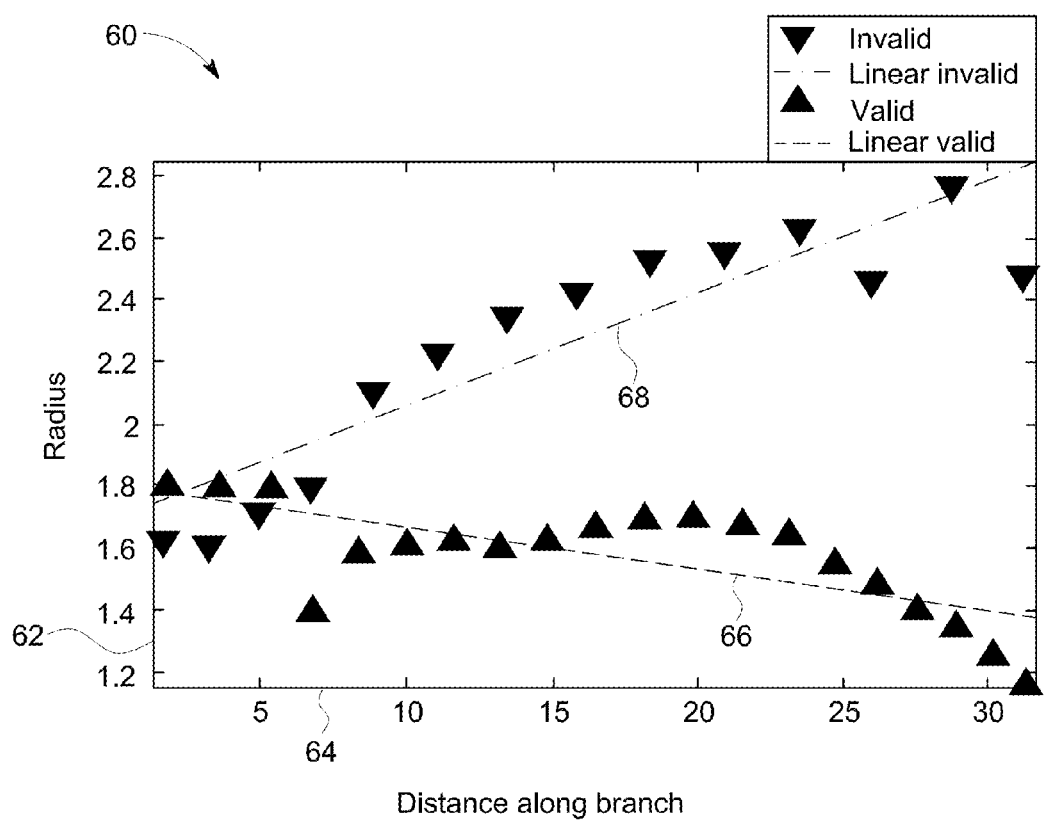
FIG. 5 is graphical representation illustrating an identification of leakage via radius profile using the medical image processing system of FIG. 1 in accordance with embodiments of the present disclosure.

Certain specific intra-branch features are helpful in analyzing radius expanding leakage. Radius expanding leakage may be expected in certain applications (e.g., coronary artery), where a radius is expected to get smaller along a valid branch while leakage acts oppositely. For example, specific intra-branch features that may help with detecting radius expanding leakage include a radius difference between an end and a front of a respective branch (radiusEndFront), and a slope of a linear regression line for a radius profile along a respective branch (slope). FIG. 5 includes a graphical representation 60 that illustrates the identification of radial expanding leakage using these specific intra-branch features. FIG. 5 includes an x-axis 62 representing a distance along a particular branch and a y-axis 64 representing a radius of the particular branch. Right-side up triangles represent data points for a valid branch and inverted (i.e., upside down) triangles represent data points for an invalid branch. A dashed line 66 represents a linear regression line for the valid branch and a dot-dashed line 68 represents a linear regression line for the invalid (e.g., leakage) branch. The linear regression lines 66, 68 (and thus their respective slopes) are derived from a liner regression performed on the radius profile of the respective branches (i.e., valid branch and invalid branch). As depicted in FIG. 5, the radius profile of the valid branch gets smaller along the length of the valid branch, while the radius profile of the invalid branch gets larger along the length of the invalid branch. Another example of a specific intra-branch feature includes a likelihood value given by a probabilistic tracking algorithm (e.g., used to generate the tracked image data 42) for a respective branch (meanLikelihood).

Returning to FIG. 2, the method 38 includes generating and training the likelihood model 56 (e.g., branch validity likelihood model) for determining a validity of branches of the plurality of blood vessels in the binary tree structure 50 (block 70). Based on the selected features, the likelihood model 56 is trained with training data 72 using a multivariate model 74. The training data 72 is independent (i.e., not related) of the tracked image data 42. The training data 72 includes data with labeled valid branches and labeled leakage. Multiple sets of training data 72 may be used to train the likelihood model 56. Examples of the multivariate model 74 used to train the likelihood model 56 may include a Gaussian model, a Random Forest model, and a SVM model. It is noted that the listed models are not inclusive and other multivariate models 74 may be used in training the likelihood model 56. The likelihood model 56 described below is trained using a Gaussian mode.

After generating and training the likelihood model 56 (block 70), the method 38 includes generating a likelihood score 76 for each branch based on the respective branch's compatibility with the likelihood model 56 (block 78). For example, the following equation may be used:

$$f(x) = \frac{1}{(2\pi)^{k/2}|\Sigma|^{1/2}} \exp\left(-\frac{1}{2}(x-\mu)'\Sigma^{-1}(x-\mu)\right). \quad (1)$$

Figure 6:
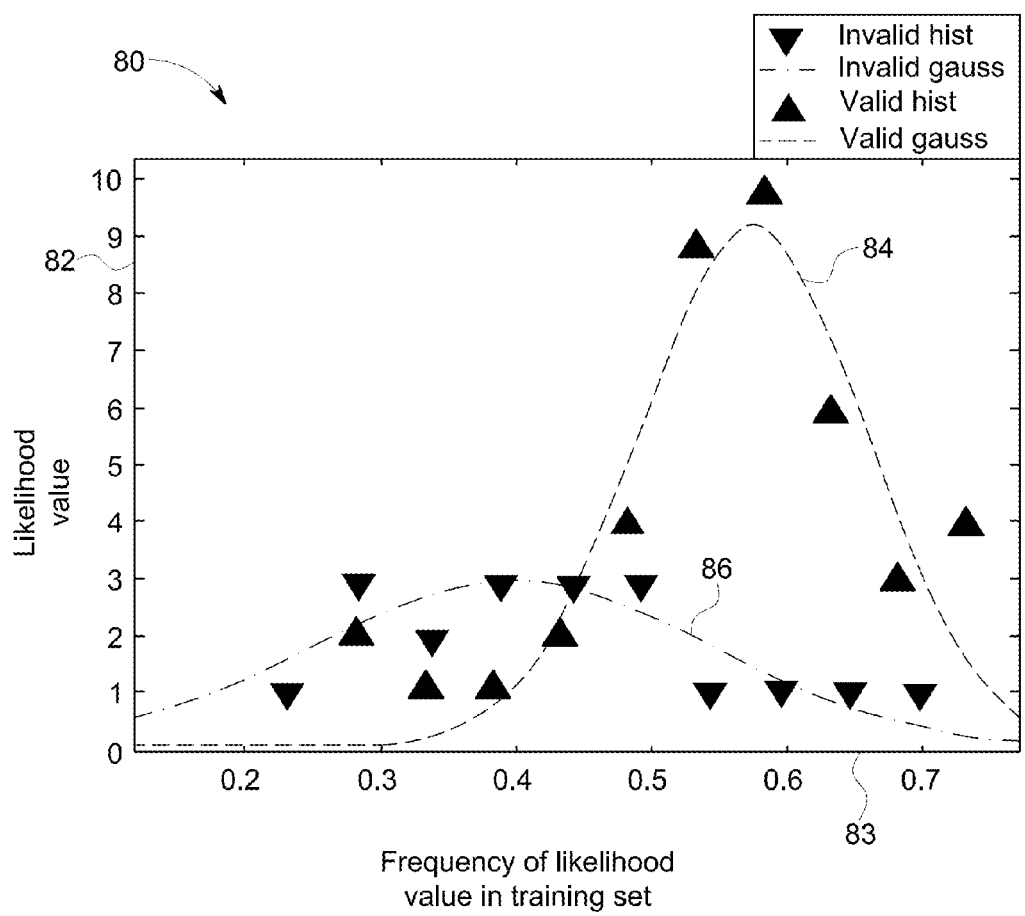
FIG. 6 is a graphical representation for likelihood value given by a probabilistic tracking algorithm using the medical image processing system of FIG. 1 in accordance with embodiments of the present disclosure.

In equation 1, x represents the feature vector, k represents the dimension of the feature, $\Sigma$ represents the covariance, and $\mu$ represents the mean. The covariance and mean are computed using the training data 72. Using equation 1, the likelihood score 76 of a particular branch can be estimated by testing its feature vector compatibility with the likelihood model 56. Likelihood scores 76 are normalized to a value that may range from approximately −1 to 1. FIG. 6 includes a graphical representation 80 (e.g., histogram) for likelihood value given by a probabilistic tracking algorithm (meanLikelihood). The graphical representation 80 includes an x-axis 82 representing a likelihood value and a y-axis 83 representing a frequency of a certain likelihood value in the training data set. Right-side up triangles represent data points for valid branches and inverted (i.e., upside down) triangles represent data points for invalid branches. A dashed line 84 represents a Gaussian distribution of valid branches and a dot-dashed line 86 represents a Gaussian distribution for the invalid (e.g., leakage) branches. The Gaussian distributions 84, 86 enable distinguishing leakage from valid branches.

Returning again to FIG. 2, the method 38 includes generating the reconstructed tree 40 for the plurality of blood vessels (block 88). In certain embodiments, global optimization using dynamic programming (e.g., dynamic programming algorithm) is performed in a single step for the tree partitioning problem. Specifically, current graph T represents the tracked vessel tree consisting of multiple segments $T=\{S_1, S_2, \ldots, S_N\}$, where S represents the segments. Each segment is assigned with a validity likelihood score $V(S_i)$, $I=1, 2, \ldots, N$. The learning-based pruning algorithm's objective is to extract a sub tree $TS \subset T$ that retains the valid vessel segments and removes the leakage. For the tree partitioning problem, the algorithm obtains the value for a set of flags $F=\{FS_1, FS_2, \ldots, FS_N\}$ that serve as validity switches for every node of T satisfying that if segment $S_k$ is excluded from the final tree, i.e. $F_{S_k}=0$, all its child nodes should also be excluded. Upon obtaining the value for the flag set, the optimization problem is set to find $T_S$ such that the corresponding validity flag set F is as follows:

$$F = \arg\max\{\Sigma_{i=0}^{N} F_{S_i} V(S_i)\}. \qquad (2)$$

As mentioned above, dynamic programming (e.g., dynamic programming algorithm) may be used to solve the tree partitioning problem. In particular, dynamic programming may solve the problem in two phases. In the first phase, each node is analyzed in a bottom-up manner to ensure that the maximum achievable score of the sub tree rooted at a candidate node is computed. After global optimization, a score may range from approximately $-N$ to $N$, where N represents the total number of nodes in the tree graph. As described above, each individual node weight (e.g., likelihood score) is normalized to $-1$ to $1$ prior to dynamic programming. In the second phase, the tree is revisited in a top-down manner so that all negative sub trees get removed (flag 0), resulting in the optimal tree $T_S$.

After determining F, the last step utilized by the learning-based pruning algorithm is to reconstruct a vessel tree $T_S$ from the current binary tree structure 50. The problem is formulated from a tree traverse perspective and dynamic programming may also be used to solve this problem. In particular, the current longest branch is iteratively selected from the tree $T_S$, and every resulting vessel branch must terminate with a termination segment which has no child. Every such branch is then assigned a distinctive identification number. As above, each node is analyzed in a bottom-up manner so that the greatest length from termination at each node at which the sub tree is rooted is computed with the following equation:

$$L_i = \max_j \{L_j(T_i)\}. \qquad (3)$$

$T_i$ represents the sub tree rooted at $S_i$ and $L_j(T_i)$ denotes the length from $S_i$ to one of its termination nodes $S_j$. Then, the tree is revisited in a depth-first order with preference in first visiting the child with the greater $L_i$, followed by the generation of the reconstructed tree 40 with proper labeling. The reconstructed tree 40 includes the compatible branches, but does not include invalid branches (e.g., leakage).

Figure 8:
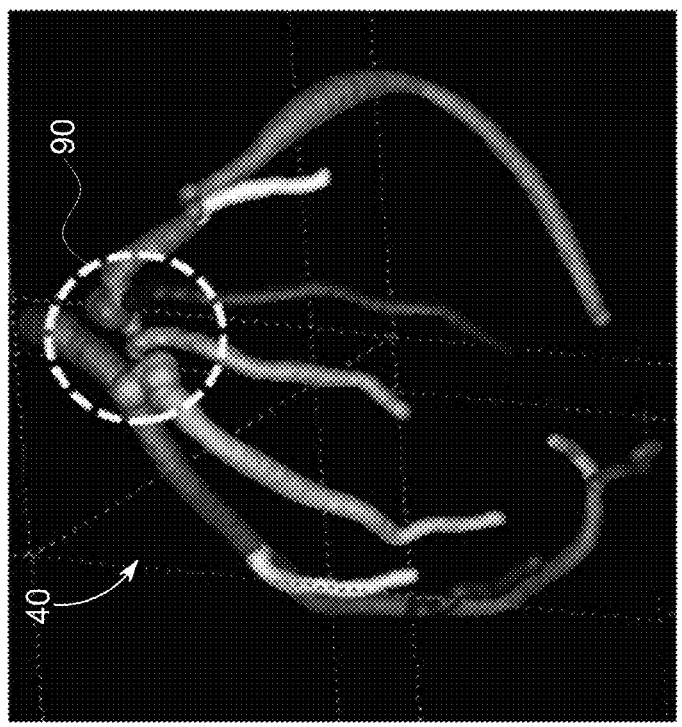
FIG. 8 is a representation of a reconstructed tree, derived from the tracked image data of FIG. 7, after pruning using the medical image processing system of FIG. 1 in accordance with embodiments of the present disclosure.
Figure 7:
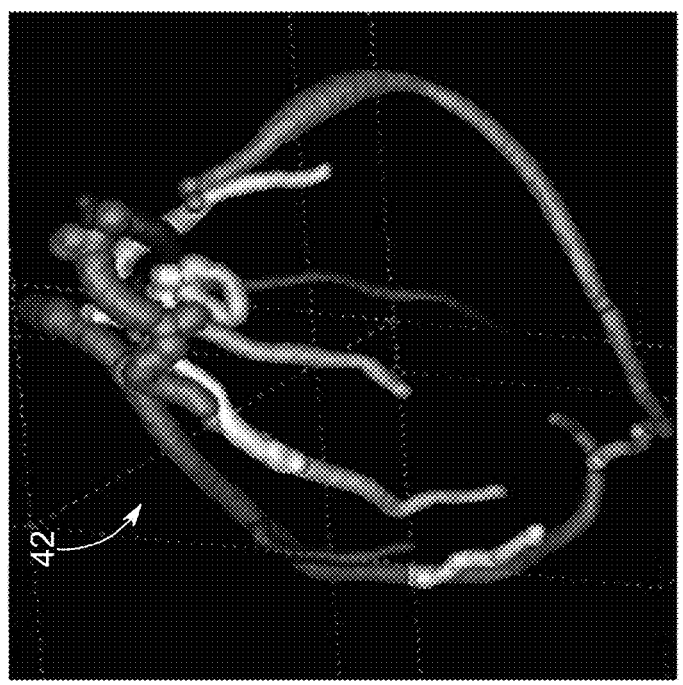
FIG. 7 is a representation of tracked image data prior to pruning and tree reconstruction.

FIGS. 7 and 8 illustrate an example of a qualitative result for the learning-based pruning algorithm. FIG. 7 represents tracked image data 42 prior to pruning and tree reconstruction, while FIG. 8 represents the reconstructed tree 40 derived from the tracked image data 42 after pruning. In FIG. 8, a dashed circle 90 indicates a region of the reconstructed tree 40 where invalid branches were removed (compare to FIG. 7).

Table 2 illustrates a quantitative result for the learning-based pruning algorithm. The original tracking results are from a probabilistic coronary artery tree tracking algorithm, while the pruning results are derived after use of the learning-based pruning algorithm. Both the original tracking results and the pruning results were independently verified by an expert. A total of 10 datasets with 124 branches were used as a training set, while the algorithm was tested in another 28 datasets that were independent of the training set. As shown in Table 2, the learning-based pruning algorithm removed most of the leaking branches, while preserving nearly all of the valid branches.

TABLE 2

|  | Valid Branch Number | Leaking Branch Number |
| --- | --- | --- |
| Original tracking result | 408 | 64 |
| Pruning | 407 | 1 |

A technical contribution for the disclosed methods is that it provides for computer implemented methods for generating the reconstructed tree 40 of a plurality of blood vessels by using a learning-based probabilistic pruning algorithm to remove objects falsely labeled as blood vessels within the tree of interest.

The disclosed embodiments may be interfaced to and controlled by a computer readable storage medium having stored thereon a computer program. The computer readable storage medium may include a plurality of components such as one or more of electronic components, hardware components, and/or computer software components. These components may include one or more computer readable storage media that generally store instructions such as software, firmware and/or assembly language for performing one or more portions of one or more implementations or embodiments of an algorithm as discussed herein. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or solid-state or electronic memory. Other forms of non-transitory and/or tangible computer readable storage media not list may be employed with the disclosed embodiments.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

Technical effects of the disclosed embodiments include methods for generating the reconstructed tree 40 for blood vessels from tracked image data 42 that includes leakage. In particular, the disclosed embodiments utilize a learning-based pruning algorithm to remove the leakage and generate the reconstructed tree 40. In particular, the pruning algorithm generates a binary tree structure 50 from the tracked image data 42, generates and trains the likelihood model 56 for determining the validity of each branch within the binary tree structure 50, generate a likelihood score for each branch based on the branch's compatibility with the likelihood model 56, and generating the reconstructive tree 40 for the blood vessels with invalid branches pruned or removed. The disclosed methods enhance the performance of vessel structure tracking methods via post-processing removal of leakage.

This written description uses examples, including the best mode, to enable any person skilled in the art to practice the disclosed embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method of post-processing medical image data, comprising:
   receiving tracked image data representative of a plurality of blood vessels;
   generating a binary tree structure for the plurality of blood vessels based on a parent-child relationship between branches of the plurality of blood vessels;
   generating a likelihood model for determining a validity of the branches of the plurality of blood vessels;
   generating a likelihood score for each branch based on the respective branch's compatibility with the likelihood model; and
   generating a reconstructed tree for the plurality of blood vessels, wherein compatible branches are included in the reconstructed tree and invalid branches are not included in the reconstructed tree.

2. The method of claim 1, wherein the tracked image data represents two-dimensional or three-dimensional image data.

3. The method of claim 1, wherein generating the binary tree structure comprises breaking each branch into a parent node and child nodes at each bifurcation point.

4. The method of claim 3, wherein the child nodes comprise a left child node and a right child node, and the left child node defines which of the child nodes is most compatible with the parent node.

5. The method of claim 1, comprising selecting one or more features of the plurality of blood vessels for use as parameters in generating the likelihood model.

6. The method of claim 5, wherein generating the likelihood model comprises training the likelihood model with training data using the selected one or more features, wherein the training data is independent of the tracked image data.

7. The method of claim 6, wherein the likelihood model is trained using a multivariate model.

8. The method of claim 7, wherein the multivariate model comprises a Gaussian model, a Random Forest model, or a support vector machine model.

9. The method of claim 5, wherein the one or more features comprise inter-branch features and intra-branch features, the inter-branch features comprise general features and specific features, and the intra-branch features comprise specific features.

10. The method of claim 9, wherein the general features of the intra-branch features are used to test a compatibility of a single branch to a parent branch.

11. The method of claim 10, wherein the intra-branch features comprise a radius difference of the single branch to the parent branch, a radius ratio of the single branch with the parent branch, or a directional difference between the single branch and the parent branch.

12. The method of claim 9, wherein the specific features of the inter-branch features comprises a minimum distance at an end of the respective branch to its left brother node, and a ratio between a mean and an end distance of the respective branch to its left brother node.

13. The method of claim 9, wherein the specific features of the intra-branch features comprise a radius difference between an end of the respective branch and a front of the respective branch, a slope of a linear regression line for a radius profile along the respective branch, and a likelihood value given by a probabilistic tracking algorithm for the respective branch.

14. The method of claim 1, wherein generating the reconstructed tree comprises using bottom-up dynamic programming to determine a maximum achievable score for a sub tree rooted at each branch, and using top-down dynamic programming to remove all sub trees with a negative score.

15. A non-transitory, computer-readable medium comprising one or more routines which executed by at least one processor causes acts to be performed comprising:
   receiving tracked image data representative of a plurality of blood vessels;
   generating a binary tree structure for the plurality of blood vessels based on a parent-child relationship between branches of the plurality of blood vessels;
   generating a likelihood model for determining a validity of the branches of the plurality of blood vessels;
   generating a likelihood score for each branch based on the respective branch's compatibility with the likelihood model; and
   generating a reconstructed tree for the plurality of blood vessels, wherein compatible branches are included in the reconstructed tree and invalid branches are not included in the reconstructed tree.

16. The computer-readable medium of claim 15, wherein generating the binary tree structure comprises breaking each branch into a parent node and child nodes at each bifurcation point, wherein the child nodes comprise a left child node and a right child node, and the left child node defines which of the child nodes is most compatible with the parent node.

17. The computer-readable medium of claim 15, comprising selecting one or more features of the plurality of blood vessels for use as parameters in generating the likelihood model.

18. The computer-readable medium of claim 17, wherein generating the likelihood model comprises training the likelihood model with training data using the selected one or more features, wherein the training data is independent of the tracked image data.

19. The computer-readable medium of claim 18, wherein the likelihood model is trained using a multivariate model, and multivariate model comprises a Gaussian model, a Random Forest model, or a support vector machine model.

20. The computer-readable medium of claim 15, wherein generating the reconstructed tree comprises executing a dynamic programming algorithm to determine a maximum achievable score for a sub tree rooted at each branch and to remove all sub trees with a negative score.

21. A computer-implemented method for generating a reconstructed tree of a plurality of blood vessels, comprising:
   using a learning-based probabilistic pruning algorithm to generate the reconstructed tree by executing the steps of:
      generating, from received tracked image data, a binary tree structure for the plurality of blood vessels based on a parent-child relationship between branches of the plurality of blood vessels, wherein the received tracked image data is representative of a plurality of tracked blood vessels;
      generating a likelihood model for determining a validity of the branches of the plurality of blood vessels, wherein the likelihood model is trained using training data, and the training data is independent of the received tracked image data;

generating a likelihood score for each branch based on the respective branch's compatibility with the likelihood model; and generating a reconstructed tree for the plurality of blood vessels using dynamic programming, wherein compatible branches are included in the reconstructed tree and invalid branches are not included in the reconstructed tree.

22. The method of claim 21, wherein one or more selected features of the plurality of blood vessels are used in generating and training the likelihood model.

23. The method of claim 21, wherein generating the reconstructed tree comprises determining a maximum achievable score for a sub tree rooted at each branch and to remove all sub trees with a negative score.

24. The method of claim 21, wherein generating the binary tree structure comprises breaking each branch into a parent node and child nodes at each bifurcation point, wherein the child nodes comprise a left child node and a right child node, and the left child node defines which of the child nodes is most compatible with the parent node.

25. The method of claim 21, wherein the likelihood model is trained using a multivariate model, and multivariate model comprises a Gaussian model, a Random Forest model, or a support vector machine model.

* * * * *